(12) United States Patent
Seedorf et al.

(10) Patent No.: US 9,392,056 B2
(45) Date of Patent: Jul. 12, 2016

(54) METHOD FOR OPERATING A NETWORK AND A NETWORK

(75) Inventors: Jan Seedorf, Heidelberg (DE); Saverio Niccolini, Heidelberg (DE); Stella Spagna, Trebisacce (IT)

(73) Assignee: NEC CORPORATION, Tokyo (JP)

( * ) Notice: Subject to any disclaimer, the term of this patent is extended or adjusted under 35 U.S.C. 154(b) by 932 days.

(21) Appl. No.: 13/581,342

(22) PCT Filed: Jul. 23, 2010

(86) PCT No.: PCT/EP2010/004537
§ 371 (c)(1),
(2), (4) Date: Aug. 27, 2012

(87) PCT Pub. No.: WO2012/010187
PCT Pub. Date: Jan. 26, 2012

(65) Prior Publication Data
US 2012/0324084 A1   Dec. 20, 2012

(51) Int. Cl.
*G06F 15/173*  (2006.01)
*H04L 29/08*  (2006.01)

(52) U.S. Cl.
CPC ............ *H04L 67/104* (2013.01); *H04L 67/101* (2013.01); *H04L 67/1002* (2013.01); *H04L 67/1042* (2013.01)

(58) Field of Classification Search
CPC ............. H04L 67/104–67/1087; H04L 67/101
USPC .......................................................... 709/223
See application file for complete search history.

(56) References Cited

U.S. PATENT DOCUMENTS

| | | | | |
|---|---|---|---|---|
| 8,606,847 | B2* | 12/2013 | Raghunath | H04L 45/00 709/201 |
| 2003/0177246 | A1 | 9/2003 | Goodman et al. | |
| 2007/0253371 | A1* | 11/2007 | Harper et al. | 370/331 |
| 2010/0293294 | A1* | 11/2010 | Hilt | H04L 67/104 709/241 |
| 2012/0144066 | A1* | 6/2012 | Medved et al. | 709/242 |
| 2013/0250770 | A1* | 9/2013 | Zou et al. | 370/238 |

FOREIGN PATENT DOCUMENTS

| | | |
|---|---|---|
| CN | 1953413 A | 4/2007 |
| CN | 1988449 A | 6/2007 |
| CN | 101820351 A | 9/2010 |
| JP | 2010157016 A | 7/2010 |

OTHER PUBLICATIONS

S. Das et al.: "ALTO: A Multi Dimensional Peer Selection Problem", Network Working GRoup, Oct. 23, 2008.*
Le Blond et al.: "Pushng BitTorrent Locality to the Limit", I.N.R.I.A., France, May 12, 2009.*

(Continued)

*Primary Examiner* — Frantz Jean
(74) *Attorney, Agent, or Firm* — Young & Thompson

(57) ABSTRACT

The invention is directed to a network, and method for operating a network, for allowing an effective traffic localization within an Application-Layer Traffic Optimization (ALTO), wherein an ALTO process is performed with regard to at least one application or resource consumer, and traffic information with respect to the at least one application or resource consumer will be provided and used within the ALTO process.

12 Claims, 4 Drawing Sheets

Overview of Protocol Interaction between ALTO Elements

(56) References Cited

OTHER PUBLICATIONS

Shibuya et al., "Evaluation of Contest Delivery Characteristics Using Network-aware P2P Simulator", IEICE Technical Report, Feb. 25, 2010, vol. 109, No. 449, pp. 67-72.

International Search Report dated Mar. 9, 2011, in corresponding PCT application.

Das S. et al: "ALTO: A Multi Dimensional Peer Selection Problem; draft-saumitra-alto-multi-ps-00.txt", ALTO: A Multi Dimensional Peer Selection Problem; Draft-Saumitra-ALTO-Multi-PS-00.TXT, Internet Engineering Task Force, IETF; Standardworkingdraft, Internet Society (ISOC) 4, Rue Des Falaises CH—1205 Geneva, Switzerland, Oct. 23, 2008, XP015059869.

Wang A. et al.: "Server notification mechanism for ALTO optimization; draft-sun-alto-notification-02.txt", Server Notification Mechanism for ALTO Optimization; Draft-Sun-ALTO-Notification-02.TXT, Internet Engineering Task Force, IETF; Standardworkingdraft, Internet Society (ISOC) 4, Rue Des Falaises CH—1205 Geneva, Switzerland, No. 2, May 20, 2010, pp. 1-12, XP015072096.

Le Blond et al.: "Pushing BitTorrent Locality to the Limit", I.N.R.I.A., France, May 12, 2009, XP002620425, Retrieved from the Internet: URL:http://arxiv.org/PS cache/arxiv/pdf/08 12/0812.0581v2.pdf.

Seedorf J. et al: "Traffic localization for P2P-applications: The ALTO approach", Peer-To-Peer Computing, 2009. P2P '09. IEEE Ninth International Conference on, IEEE, Piscataway, NJ, USA, Sep. 9, 2009, pp. 171-177, XP031544872.

Rimac I. et al: "A Survey on Research on the Application-Layer Traffic Optimization (ALTO) Problem; draft-irtf-p2prg-alto-survey-05.txt", A Survey on Research on the Application-Layer Traffic Optimization (ALTO) Problem; Draft-IRTF-P2PRG-ALTO-Survey-05.TXT, Internet Engineering Task Force, IETF; Standardworkingdraft, Internet Society (ISOC) 4, Rue Des Falaises CH—1205 Geneva, Switzerland, No. 5, Jun. 29, 2010, pp. 1-19, XP015069159.

Seedorf J. et al.:"Application-Layer Traffic Optimization (ALTO) Problem Statement; rfc5693.txt", Application-Layer Traffic Optimization (ALTO) Problem Statement; RFC5693.TXT, Internet Engineering Task Force, IETF; Standard, Internet Society (ISOC) 4, Rue Des Falaises CH—1205 Geneva, Switzerland, Oct. 1, 2009, XP015065705.

English translation of Chinese Office Action, dated Jul. 9, 2014, from corresponding CN application.

English translation of Chinese Search Report, dated Jun. 27, 2014, from corresponding CN application.

\* cited by examiner

Figure 1: Overview of Protocol Interaction between ALTO Elements

METHOD FOR OPERATING A NETWORK AND A NETWORK

The present invention relates to a method for operating a network, especially an IP (Internet Protocol) network, wherein an ALTO™ (Application-Layer Traffic Optimization) process is performed with regard to at least one application or resource consumer. Further, the present invention relates to a network, especially an IP network, comprising means for performing an ALTO™ (Application-Layer Traffic Optimization) process with regard to at least one application or resource consumer.

BACKGROUND OF THE INVENTION

Recently, researchers have started to propose and investigate approaches where information—such as topology, cost, or policies—provided by the underlying network layer can help reduce certain problems caused by application-layer traffic, such as a high volume of inter-ISP (Internet Service Provider) traffic because certain applications do not consider network layer locality. Given that a certain resource, e.g. some specific data or a chunk of a file, is available at several clients of a decentralized application, traffic flows can be optimized if a resource consumer, i.e. a client which would like to download a certain resource, can select among different resource providers in a way which is "better-than-random". Application-Layer Traffic Optimization (ALTO™) is currently being developed as an IETF™ (Internet Engineering Task Force) standard for better-than-random resource provider selection by providing information regarding the underlying network. When operators are trying to localize data exchange between resource consumers and resource providers in order to save costs, e.g., using ALTO™ information, there is the risk to incur in a dangerous drawback, i.e., to "over-localize" the traffic preventing resource consumers from achieving an acceptable service quality, e.g., not receiving all data they need in the case of a live streaming application.

In the IETF™ ALTO™ working group, a protocol is being standardized for guiding applications, e.g., P2P (Peer-to-Peer) applications, so that they can perform "better-than-random" resource provider selection, see RFC 569, J. Seedorf, E. Burger: Application-Layer Traffic Optimization (ALTO™) Problem Statement (reference 1). Currently, many distributed applications, e.g. P2P applications, choose their peers to connect with more or less randomly. This creates high costs for ISPs because content which may be available close on the network layer topology is fetched from resource providers far away on the network layer topology.

With ALTO™, applications, e.g., P2P ones, can obtain information about candidate resource providers from an ALTO™ server, which is e.g. provided by the ISP of the application's user, to optimize resource provider selection. The kind of information that is meaningful to convey to applications via an out-of-band ALTO™ service is any information that applications cannot easily obtain themselves and that changes on a much longer time scale than the instantaneous information used for congestion control on the transport layer, see reference 1. Examples for such information are operator's policies, geographical location or network proximity, e.g., the topological distance between two peers, the transmission costs associated with sending/receiving a certain amount of data to/from a peer, or the remaining amount of traffic allowed by a peer's operator, e.g., in case of quotas or limited flat-rate pricing models.

Reference 1 describes the ALTO™ problem statement in detail. FIG. 1 shows a typical ALTO™ scenario (taken from reference 1). Note that in this figure the typical use case of ALTO™ with resource consumers and providers being peers in a P2P network is depicted.

The vision of ALTO™ is that ISPs and applications can achieve a win-win-situation where applications can maintain or even increase their performance while ISPs can reduce traffic transmission costs. One way for ISPs to achieve cost reduction through ALTO™ is through traffic localization: suggesting to resource consumers other resource providers through ALTO™ which are in the same ISP.

State-of-the-art solutions for ALTO™ provisioning suggest to feed the following kinds of information into an ALTO™ server:
- operator's policies
- geographical location information or network layer proximity
- the transmission costs associated with sending/receiving a certain amount of data to/from a resource provider It is, however, an open research question how to adequately provision information into an ALTO™ server such that both ISPs and applications have a benefit. More specifically, the problem of achieving a win-win-situation between ISPs' goals and applications' requirements has not been considered in detail.

It is an object of the present invention to improve and further develop a method for operating a network and an according network for allowing a very effective traffic localization within ALTO™.

SUMMARY OF THE INVENTION

In accordance with the invention, the aforementioned object is accomplished by a method and by a network in accordance with the following description and the claims associated therewith.

In accordance with a preferred embodiment of the invention, a method is characterized in that traffic information with respect to said at least one application or resource consumer will be provided and used within said ALTO™ process.

In accordance with another preferred embodiment of the invention, a network is characterized by means for providing traffic information with respect to said at least one application or resource consumer for use within said ALTO™ process.

According to the invention it has been recognized that it is possible to allow a very effective traffic localization within ALTO™ by providing and using traffic information with respect to said at least one application or resource consumer. On the basis of such a traffic information provision both service providers and applications or resource consumers have a benefit. A win-win-situation between the goals of service providers and the requirements of applications or resource consumers can be achieved.

Within a preferred embodiment the traffic information could comprise a current traffic localization degree. This could be a current "locality-degree" of a service provider for a certain application. Preferably, said ALTO™ process could be performed within an ALTO™ server.

With regard to a very effective traffic localization the traffic information could be provided frequently, preferably at predetermined time intervals or upon request by said ALTO™ process or said ALTO™ server, to said ALTO™ process or to said ALTO™ server.

The provision of the traffic information can be performed in different ways. Within one preferred embodiment the traffic information could be provided by a service provider, especially an ISP (Internet Service Provider). Within a further preferred embodiment the traffic information could be provided by service provider, which hosts said ALTO™ server.

Within another preferred embodiment the traffic information could be obtained from a sending or feedback process to the ALTO™ process or ALTO™ server by at least one resource consumer or application. On the basis of such a feedback process a very effective ALTO™ process is possible.

With regard to a very simple sending or feedback process the traffic information could be provided to the ALTO™ process or ALTO™ server together with regular ALTO™ queries by a resource consumer or by an application.

Within an alternative and also preferred embodiment the traffic information could be obtained by a service provider measurement or by a service provider traffic monitoring. This would require an according measurement or monitoring infrastructure of the service provider.

The traffic information could comprise a localization statistics computed over all connections or links of a respective resource consumer or application or could comprise a localizations statistics computed over all exchanged chunks of a respective resource consumer or application. Both above mentioned localization statistics are useful to provide an effective ALTO™ process. However, there are other possibilities in computing or providing a suitable traffic information.

With regard to a very effective traffic localization the ALTO™ process could dynamically adapt a guidance information with regard to a resource provider selection for at least one resource consumer or application, based on said traffic information or especially based on the current traffic localization degree information.

By the invention it is possible to provide a more dynamic ALTO™ server provisioning than state-of-the-art technology, by feeding information, which could be obtained from resource consumers or through service provider or ISP measurements, regarding the traffic localization degree specific for a certain application into an ALTO™ server frequently. On the basis of the invention it is possible to prevent over-localization, i.e. the problem of resource consumers getting disconnected from important resource providers or not getting data items in time because they are connected to too many local resource providers. The invention can improve state-of-the-art ALTO™ server provisioning in such a way that optimal traffic localization can be achieved.

An important aspect of this invention is to introduce a control mechanism for ALTO™ where information regarding the traffic localization degree, i.e., the current "locality-degree" of an ISP or service provider for a certain application, is fed into an ALTO™ server frequently and helps avoiding the "over-localization" phenomenon. Such information can be practically retrieved by the ISP or service provider, which hosts the ALTO™ server, in different ways:

a) obtained from resource consumers as feedback to the ALTO™ server
b) through ISP or service provider measurements The ALTO™ server can then dynamically adapt the guidance information it sends to resource consumers based on the current localization degree in the ISP's or service provider's network.

Resource consumers can provide their current localization degree to the ALTO™ server frequently, e.g. piggybacked to regular ALTO™ queries. Each resource consumer rc would frequently send the localization statistic computed over all its connections ($Loc_{Link}(rc_i)$) or the localization statistic computed over the exchanged chunks ($Loc_{Chunk}(rc_i)$) to the ALTO™ server which could use these values to compute the overall localization degree.

As an alternative to receiving this feedback directly from resource consumers, an ISP or service provider hosting an ALTO™ server could also measure resource consumers' localization degree, given certain circumstances. If, for instance, the application to be optimized uses well-known ports, and the ISP or service provider has the necessary monitoring infrastructure in place, this ISP or service provider could in principle measure the above mentioned localization statistics $Loc_{Link}(rc_i)$ or by $Loc_{Chunk}(rc_i)$ monitoring traffic. Note that this probably requires a sophisticated monitoring infrastructure by the ISP or service provider.

By the above invention dynamically changing locality-information can be taken into account to adapt/tune ALTO™-guidance, achieving a more dynamic ALTO™-guidance. Further, effective means to prevent over-localization in ALTO™-guidance can be provided, thus optimal traffic localization can be achieved and not only "better-then-random" and truly a win-win-situation between service providers and applications, e.g., P2P applications, can be reached. By means of the invention a service provider can detect over-localization and can dynamically adapt its ALTO™-guidance.

Up to now the proper provisioning of information into an ALTO™-server is out-of-scope for IETF™ standardization and also has not received much attention in research. This invention targets precisely such provisioning of an ALTO™-server with useful information to enable the ALTO™ server to guide resource provider selection properly, i.e., such that the ISP or service provider saves costs through traffic localization and applications maintain reasonable performance at the same time, e.g. by receiving required data items in time.

BRIEF DESCRIPTION OF THE DRAWINGS

There are several ways how to design and further develop the teaching of the present invention in an advantageous way. To this end, it is to be referred to the patent claims subordinate to patent claim 1 on the one hand and to the following explanation of preferred examples of embodiments of the invention, illustrated by the drawing on the other hand. In connection with the explanation of the preferred embodiments of the invention by the aid of the drawing, generally preferred embodiments and further developments of the teaching will be explained. In the drawings

DETAILED DESCRIPTION OF THE PREFERRED EMBODIMENTS

Figure 1:
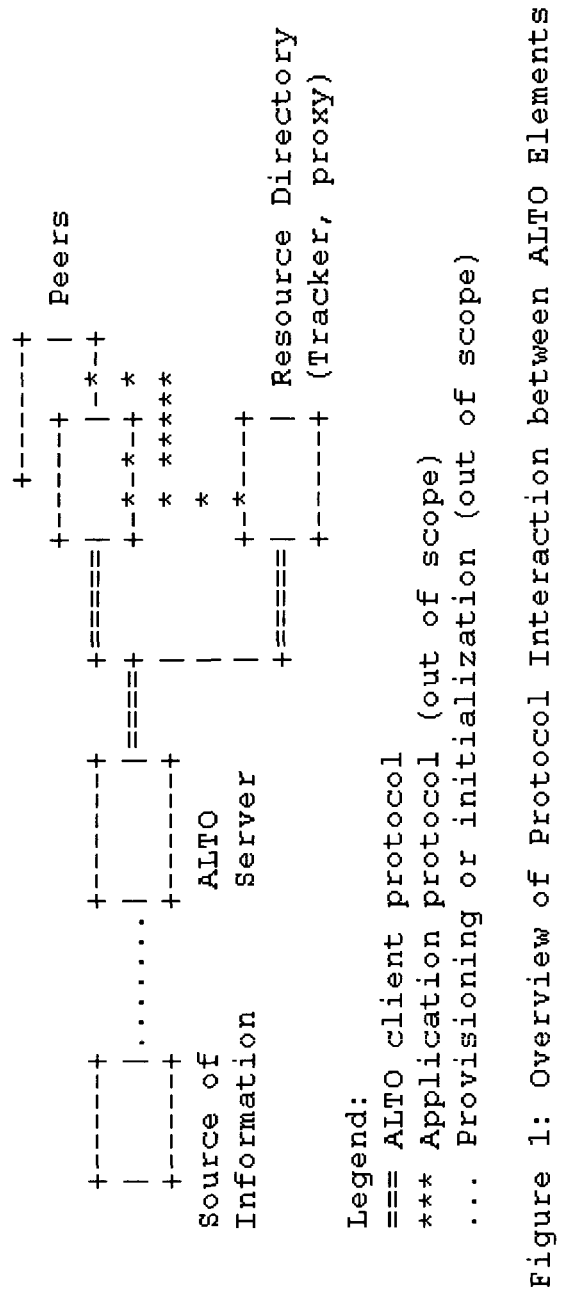
FIG. 1 is showing an overview of protocol interaction between ALTO™ elements.

FIG. 1 is showing a typical use case of an ALTO™ process with resource consumers and providers being peers in a P2P network. Especially, FIG. 1 is showing an overview of protocol interaction between ALTO™ elements, wherein the region of the invention is shown in the left part of FIG. 1.

One underlying assumption of this invention is that there exists a certain "optimal" degree of localization which balances ISPs' and applications' interest in the best way. Note that this "optimal" localization degree is highly application dependent, e.g. it is most probably very different for live streaming than for file-sharing, and needs not to be known/computed for the invention to work. An advantage of the invention is to dynamically adapt the ALTO™ information provided to resource consumers such that an optimal balance between localization and application performance can be achieved. This invention targets thus a more dynamic ALTO™ server provisioning than state-of-the-art technology.

An important aspect of this invention is to introduce a feedback mechanism for ALTO™ where information regarding the traffic localization degree for a certain application—i.e. the ISPs current "locality-degree" for such an application—is fed into an ALTO™ server frequently. Such information can be retrieved by the ISP which preferably hosts the ALTO™ server in different ways:
  a) obtained from resource consumers as feedback to the ALTO™ server
  b) through ISP or service provider measurements.

The ALTO™ server can then dynamically adapt the guidance information it sends to peers or resource consumers based on the current localization degree in the ISP's or service provider's network.

Definition/Computation of Localization Degree:

To determine the current situation in its network with respect to traffic localization, the ALTO™-provider—usually the ISP or service provider of the application's user—needs to compute the degree of traffic localization. For precisely computing the localization degree there are given two preferred examples below, i.e. computing locality based on links among peers or computing locality based on actual chunks of data exchanged among peers. In any case, the ALTO™-provider can compute the overall localization degree for its network based on singular values retrieved or measured from N participating resource consumers. Note that each resource consumer using ALTO™ knows which of its neighbour resource providers are connected via intra-ISP links and which are not because such information will be provided through ALTO™.

1. Computing locality based on links; Link-based locality:

$$Loc_{Link}(rc_i) = \frac{\sum intraISPlinks}{\sum extraISPlinks}$$

$$Loc_{Link}(ISPj) = \frac{\sum_{i=1}^{N} Loc_{link}(rc_i)}{N}$$

2. Computing locality based on chunks; Chunk-based locality:

$$Loc_{Chunk}(rc_i) = \frac{\sum intraISPchunks}{\sum extraISPchunks}$$

$$Loc_{Chunk}(ISPj) = \frac{\sum_{i=1}^{N} Loc_{Chunk}(rc_i)}{N}$$

Obtaining Localization Information:

There are outlined two preferred ways for an ISP or service provider to obtain the necessary information to compute the current localization degree:

a) From resource consumers as feedback to ALTO™: Resource consumers can provide their current localization degree to the ALTO™ server frequently—e.g. piggybacked to regular ALTO™ queries. Each resource consumer would frequently send $Loc_{Link}(rc_i)$ or $Loc_{Chunk}(rc_i)$ to the ALTO™ server which could use these values to compute the overall localization degree as outlined above.

Figure 2:
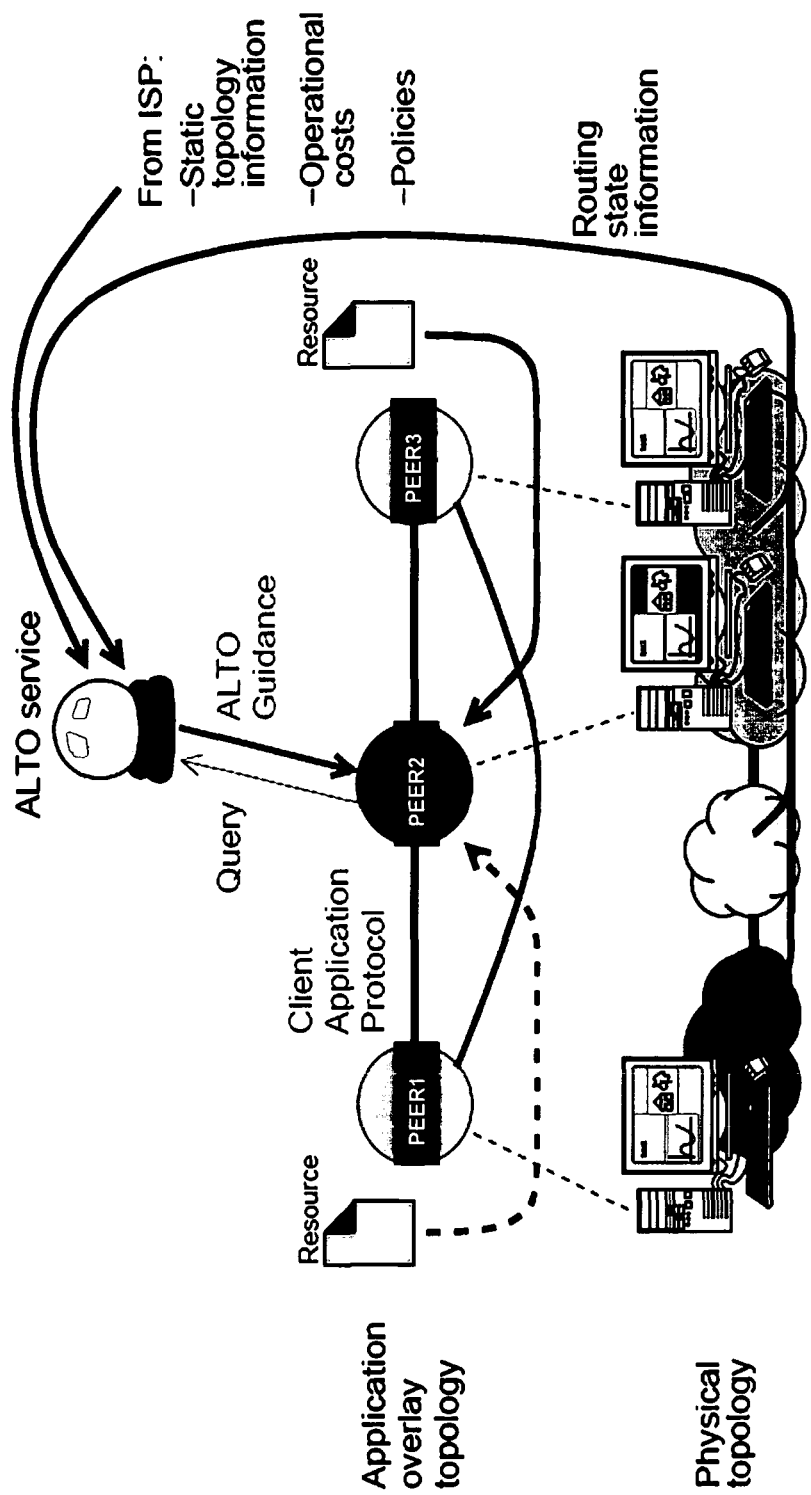
FIG. 2 is illustrating a state of the art ALTO™ provisioning.

FIG. 2 shows state-of-the-art ALTO™ provisioning, exemplified for P2P applications.

Figure 3:
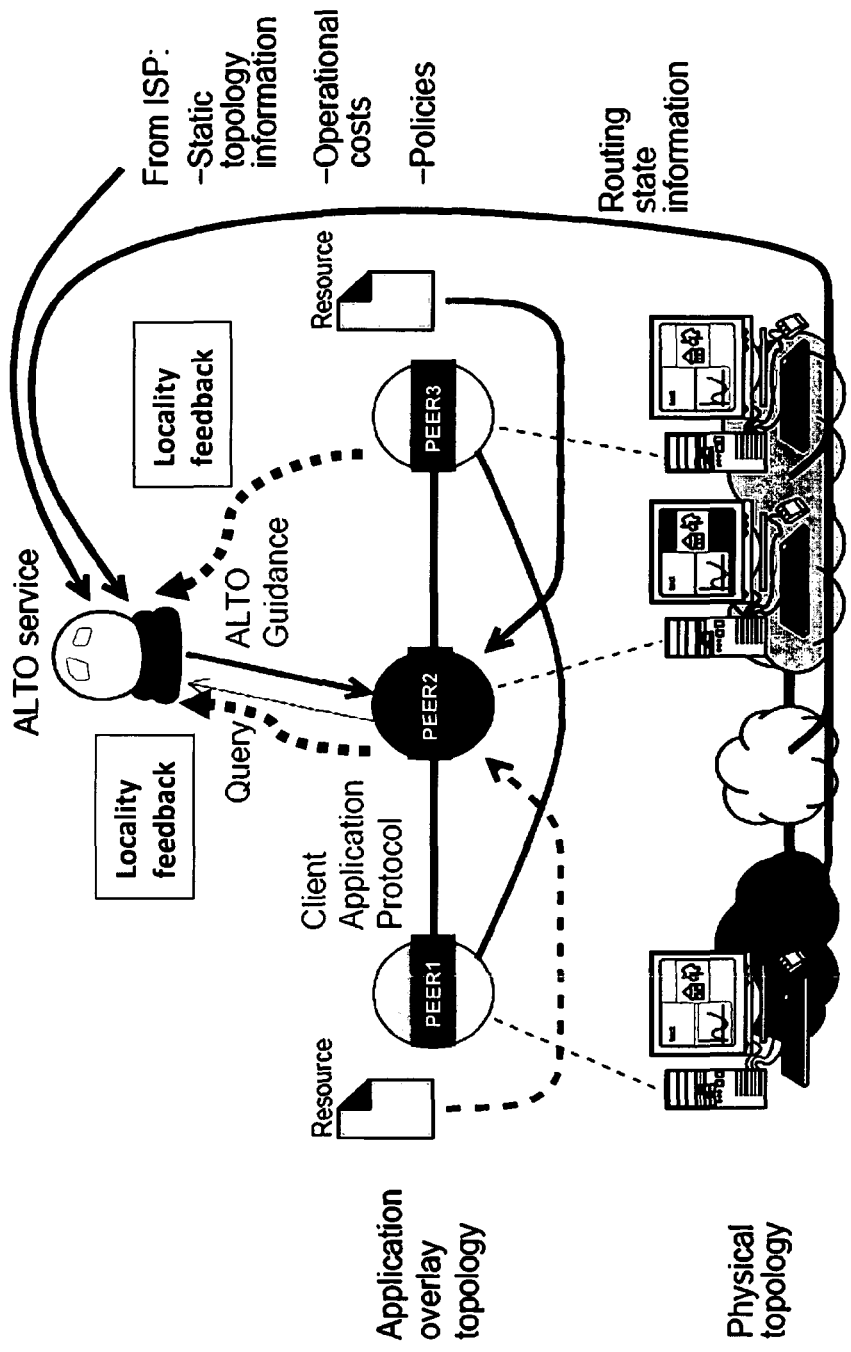
FIG. 3 is illustrating a first embodiment of an ALTO™ process according to the invention with a peer feedback and FIG. 4 is illustrating a second embodiment of an ALTO™ process according to the invention with locality feedback from ISP measurements.

FIG. 3 shows ALTO™ provisioning with the invention and localization degree feedback from resource consumers, i.e. in the example peers of a P2P application.

b) Through ISP or service provider measurements: As an alternative to feedback from resource consumers, an ISP or service provider hosting an ALTO™ server could also measure resource consumers' localization degree, given certain circumstances. If, for instance, the application to be optimized uses well-known ports, and the ISP or service provider has the necessary monitoring infrastructure in place, this ISP or service provider could in principle measure $Loc_{Link}(rc_i)$ or $Loc_{Chunk}(rc_i)$ by monitoring traffic. Note that this probably requires an ad-hoc monitoring infrastructure by the ISP or service provider.

Figure 4:
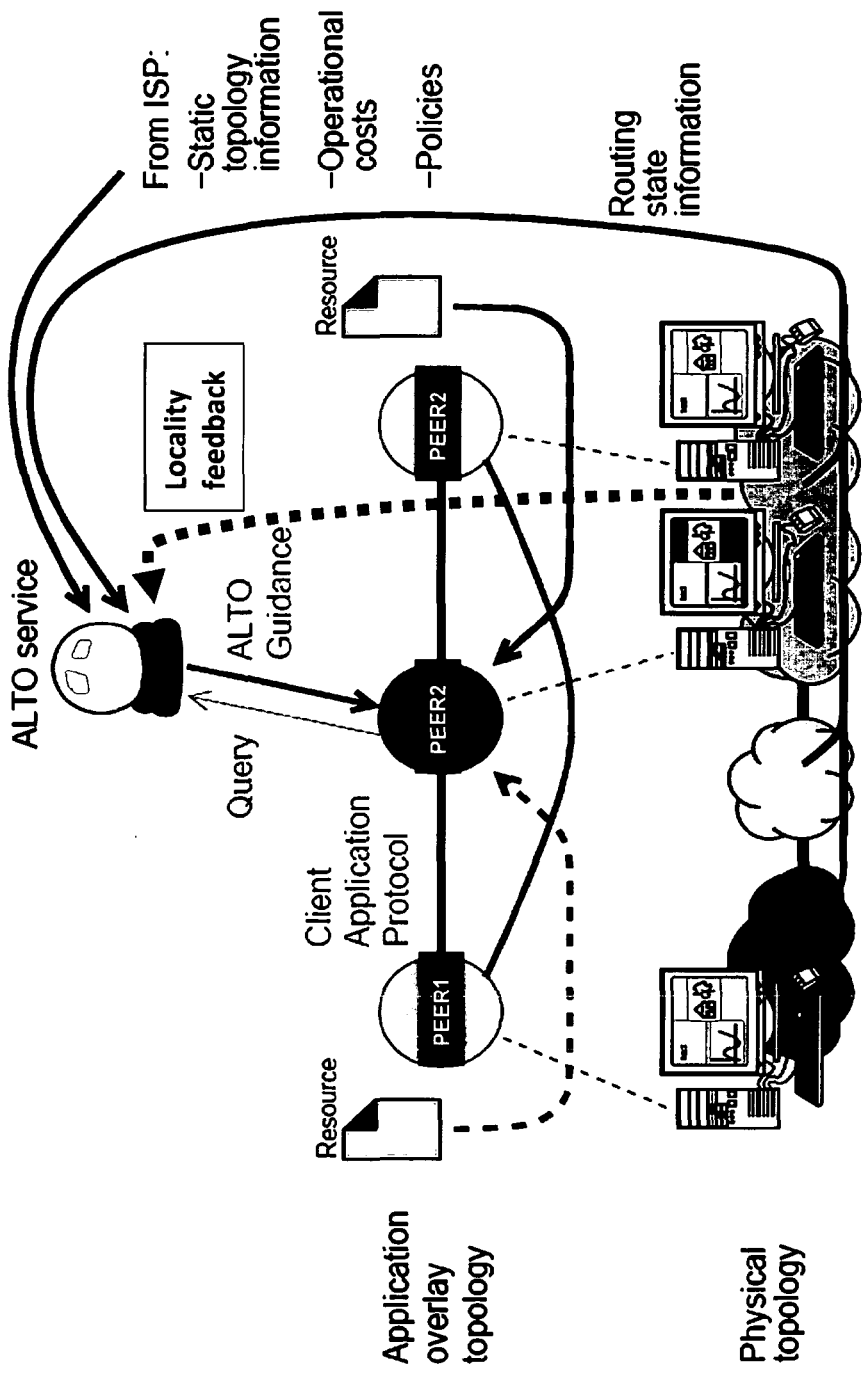

FIG. 4 shows a further embodiment of an ALTO™ process according to the invention with locality feedback measured by the ISP or service provider.

On the basis of the present invention it is possible to introduce a client—resource consumer—feedback mechanism to optimize ALTO™ guidance. It is further possible to take into account dynamically changing locality-information to adapt/tune ALTO™ guidance. Thus, effective means to prevent over-localization in ALTO™-guidance and a mechanism to tune ALTO™ for "optimal" traffic localization can be provided.

In other words, by means of the invention a system can be provided for adapting ALTO™-server guidance according to feedback received from resource-consumers which are guided through ALTO™, where the feedback is derived from traffic statistics. The traffic statistics can be particularly local. The feedback could be received from clients, i.e. resource consumers, themselves or can be received from measurements done by the service provider or ISP.

By means of the invention the problem of optimal locality can be solved for achieving a win-win-situation between ISPs and applications in ALTO™ guidance. ISP-locality or service provider locality can be taken into account for a more dynamic ALTO™-guidance. The ISP or service provider can detect over-localization and dynamically adapt its ALTO™-guidance by means of the invention. Optimal traffic localization can be achieved and not only "better-then-random".

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for operating a network, especially an Internet Protocol (IP) network, wherein an Application-Layer Traffic Optimization (ALTO™) process is performed with regard to at least one application or resource consumer, wherein traffic information with respect to said at least one application or resource consumer will be provided and used within said ALTO™ process,
wherein the traffic information comprises a current traffic localization degree, and
wherein the traffic information will be obtained from a sending or feedback process to the ALTO™ process or ALTO™ server by at least one resource consumer or application.

2. The method according to claim 1, wherein said ALTO™ process is performed within an ALTO server.

3. The method according to claim 1, wherein the traffic information is provided frequently, preferably at predetermined time intervals or upon request by said ALTO process or said ALTO™ server, to said ALTO™ process or to said ALTO server.

4. The method according to claim 1, wherein the traffic information will be provided by a service provider, especially an Internet Service Provider (ISP).

5. The method according to claim 1, wherein the traffic information will be provided by a service provider, which hosts said ALTO™ server.

6. The method according to claim 1, wherein the traffic information will be provided to the ALTO™ process or ALTO™ server together with regular ALTO™ queries by a resource consumer or by an application.

7. The method according to claim 1, wherein the traffic information will be obtained by a service provider measurement or by a service provider traffic monitoring.

8. The method according to claim 1, wherein the traffic information comprises a localization statistics computed over all connections or links of a respective resource consumer or application.

9. The method according to claim 1, wherein the traffic information comprises a localization statistics computed over all exchanged chunks of a respective resource consumer or application.

10. The method according to claim 1, wherein the ALTO™ process dynamically adapts a guidance information with regard to a resource provider selection for at least one resource consumer or application, based on said traffic information.

11. The method according to claim 1, wherein the ALTO™ process dynamically adapts a guidance information with regard to a resource provider selection for at least one resource consumer or application, based on the current traffic localization degree information.

12. A network for carrying out the method according to claim 1, comprising means for performing an Application-Layer Traffic Optimization (ALTO™) process with regard to at least one application or resource consumer,
wherein means for providing traffic information with respect to said at least one application or resource consumer for use within said ALTO™ process.

* * * * *